Nov. 23, 1937.  A. F. MOYER ET AL  2,099,902
TRACTOR PROPELLED GANG LAWN MOWER
Original Filed Aug. 5, 1931  6 Sheets-Sheet 1

INVENTOR
AMOS F. MOYER
GUSTAVE C. KLEIDON
BY Paul, Paul, & Moore
ATTORNEYS

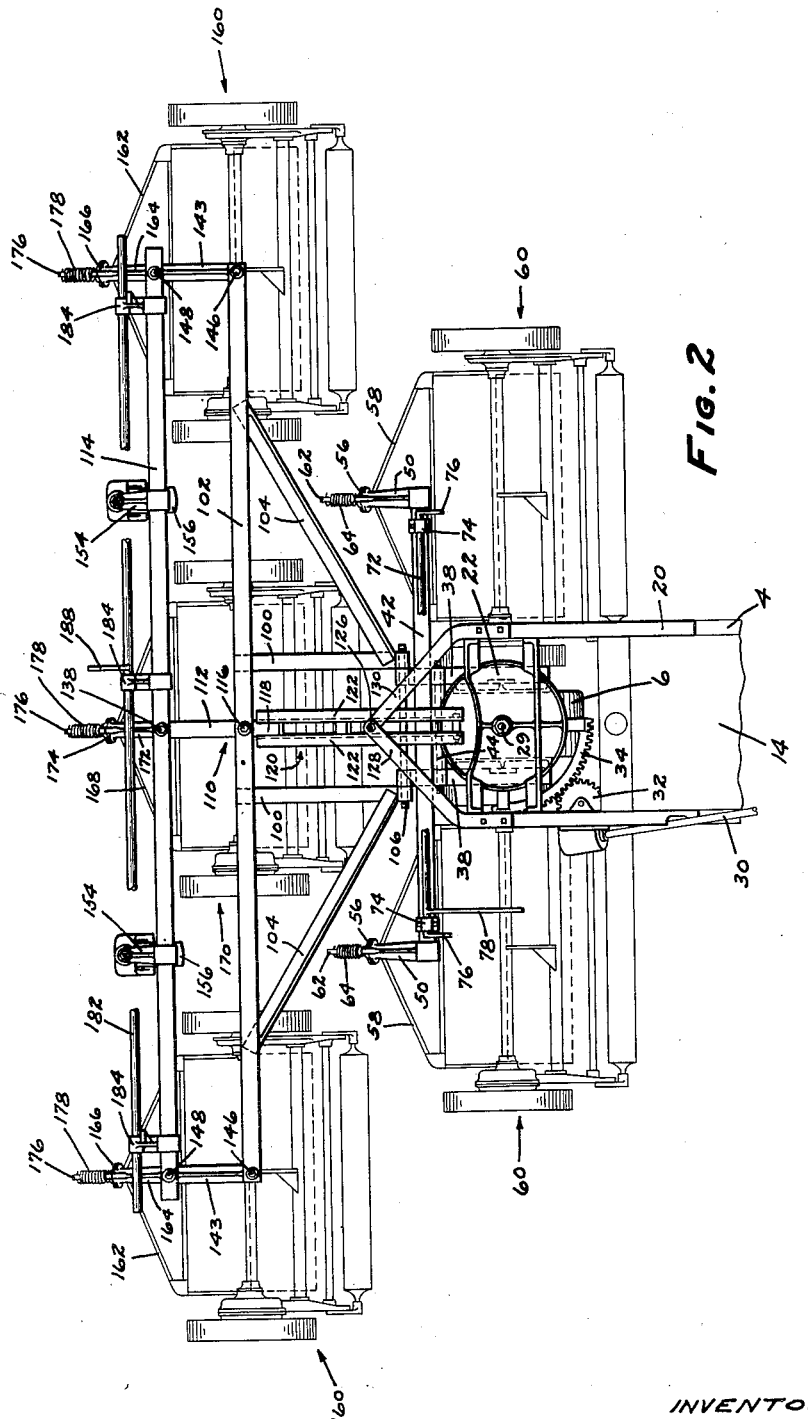

Nov. 23, 1937.  A. F. MOYER ET AL  2,099,902
TRACTOR PROPELLED GANG LAWN MOWER
Original Filed Aug. 5, 1931   6 Sheets-Sheet 3
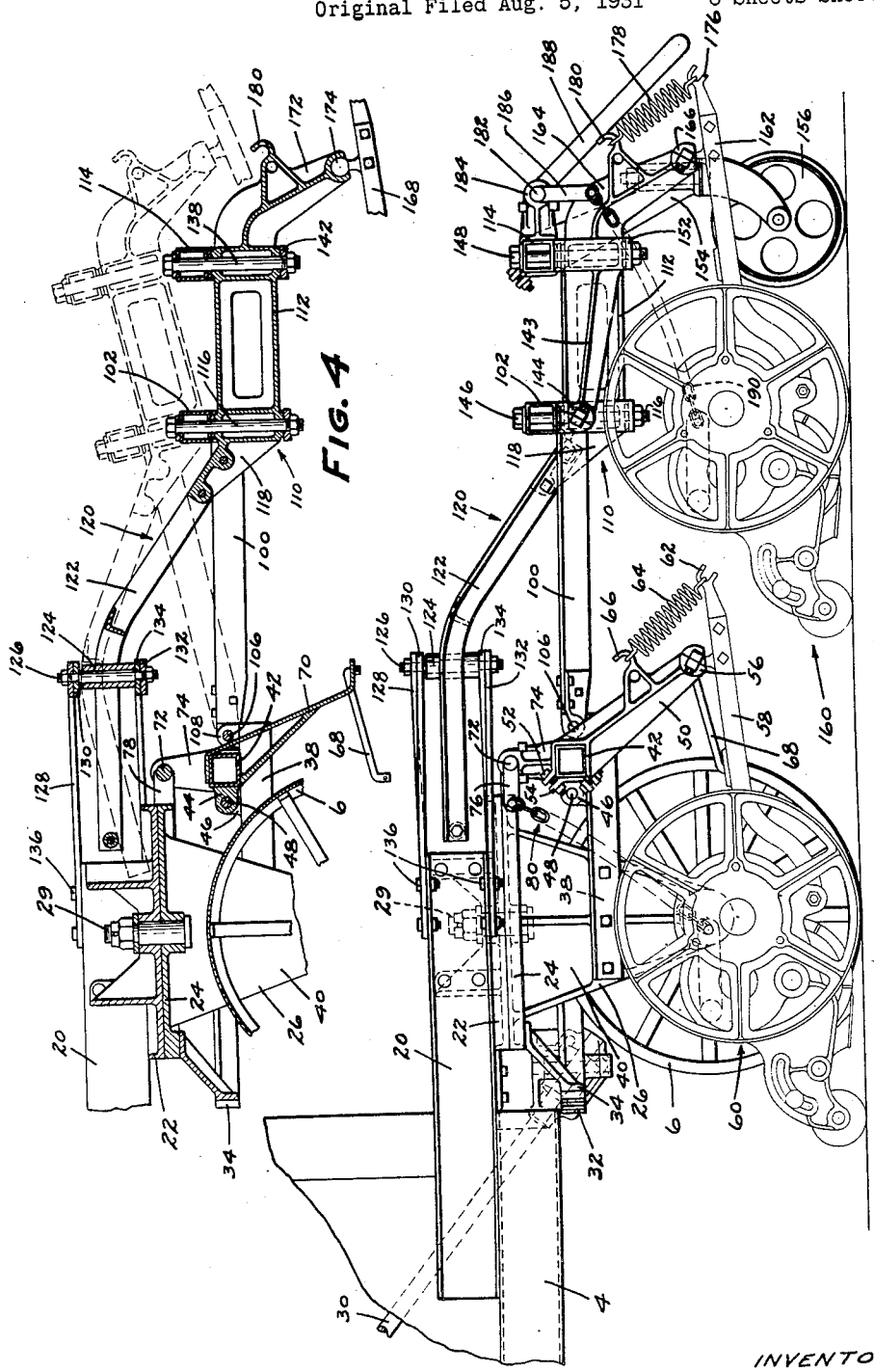
INVENTOR
AMOS F. MOYER
GUSTAVE C. KLEIDON
BY Paul, Paul, & Moore
ATTORNEYS Nov. 23, 1937.   A. F. MOYER ET AL   2,099,902
TRACTOR PROPELLED GANG LAWN MOWER Original Filed Aug. 5, 1931   6 Sheets-Sheet 4

INVENTORS
AMOS F. MOYER
GUSTAVE C. KLEIDON
BY Paul, Paul & Moore
ATTORNEYS

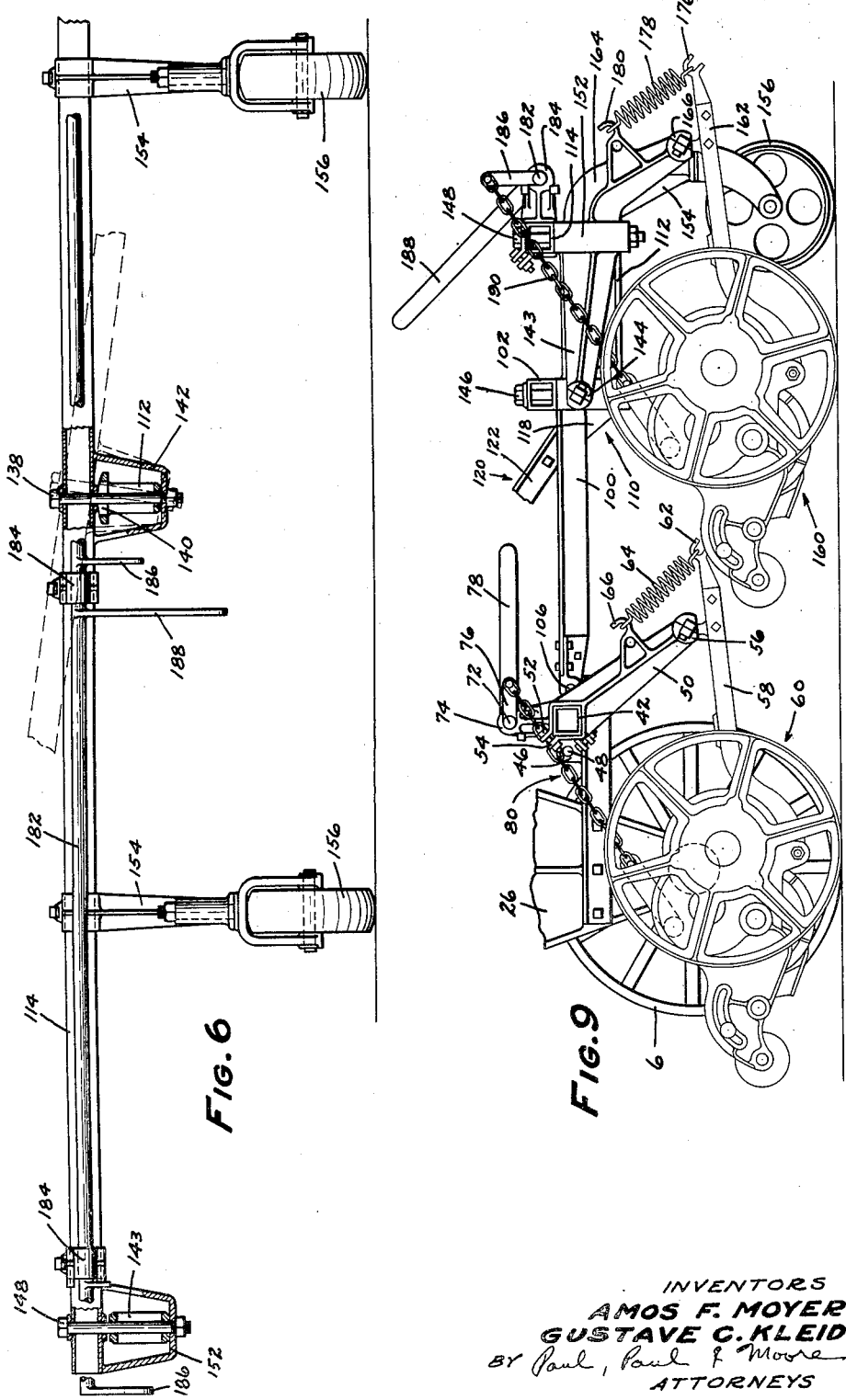

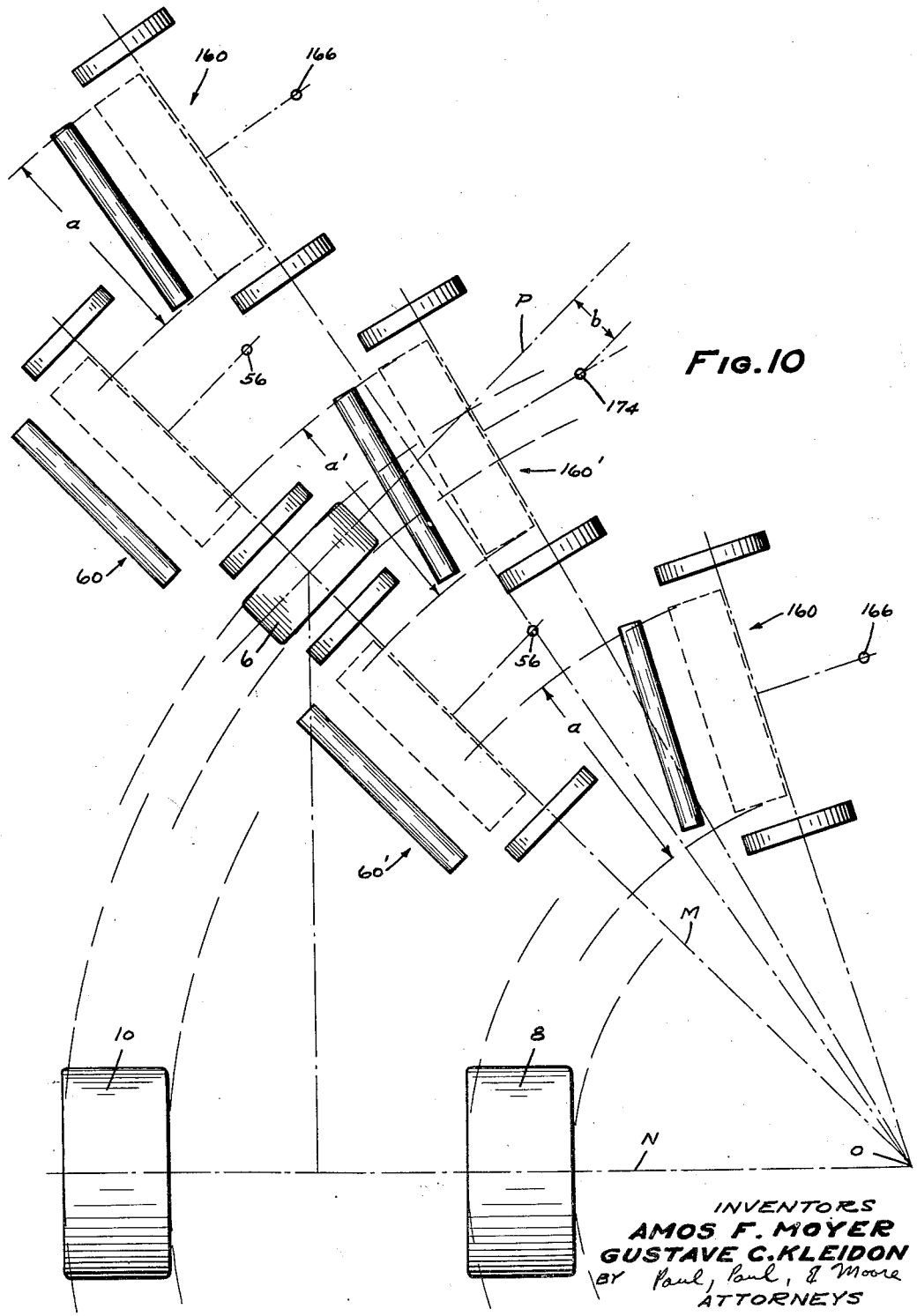

Patented Nov. 23, 1937

2,099,902

UNITED STATES PATENT OFFICE 2,099,902

TRACTOR PROPELLED GANG LAWN MOWER

Amos F. Moyer and Gustave C. Kleidon, Minneapolis, Minn., assignors, by mesne assignments, to Toro Manufacturing Corporation of Minnesota, a corporation of Minnesota Application August 5, 1931, Serial No. 555,158
Renewed June 30, 1936

33 Claims. (Cl. 56—7)

This invention relates to tractor propelled gang lawn mowers of the type used on golf courses, large parks, etc. More particularly, the invention pertains to such gang lawn mowers which are commonly known as the "pusher" type and in which the cutting elements of the various mower units in the gang are all arranged forward of the drive wheels of the tractor. Specifically, the invention concerns itself with a tractor propelled gang lawn mower in which the cutting elements of the various mower units are arranged forward of any supporting wheel of the tractor, thereby to be in full view of the operator, to enable cutting in close corners, and to cut all of the grass before it is pressed down by the passage of a tractor wheel.

Tractors of this specific type, for pushing mowers ahead of any front steering wheel of the tractor, as heretofore constructed, have encountered a great deal of difficulty in attempting to propel the mowers around curves. This is because the direction of the draft force of the mowers then becomes so greatly inclined to the center line of the tractor and of the tractor drive wheel propelling force, that the tractor front steering wheel or wheels will be transversely skidded, resulting in serious damage to the turf. This drawback has heretofore prevented this type of gang lawn mower combination from becoming a practical success.

It is a general object of the invention to provide means in a gang lawn mower wherein the mower units are propelled ahead of the wheels of a tractor, for steering one transverse row of cutting units with the tractor so that their swaths always overlap the swaths of the units of the other row, even when traveling on a curve of relatively short radius so that no uncut strips or streaks are left on curves traversed by the gang.

Another object of the invention is the provision of a separate friction brake on each drive wheel of the tractor in order to assist the tractor in propelling the units laterally of its own driving wheels when making short turns, each of the friction brakes being separately operable by an individual foot pedal.

A further object of the invention comprises the arrangement of the mowers of the rear row in such manner as to assist in holding the front wheel of the tractor against skidding when going around turns.

Still another object of the invention is the provision of simplified means for connecting the tractor and mower units of the gang which enable ready attachment and detachment of the mowers from the tractor so as to leave the tractor available for general utility work other than lawn mowing.

These and other objects of the invention will become more readily apparent upon a detailed study of the accompanying drawings and specification together with the appended claims.

In the drawings, Fig. 1 is a plan view of a gang lawn mower embodying features of my invention when proceeding around a curve;

Fig. 2 is a plan view showing the front of the tractor and the mower units when proceeding along a straight line;

Fig. 3 is a side elevation showing the mower units and their connections with the propelling tractor;

Fig. 4 is a vertical longitudinal section through the structure shown in Fig. 3;

Fig. 6 is a detailed view of the front equalizer bar, parts being broken away;

Fig. 9 is a side elevation showing the mower units with their cutters raised from the ground;

Fig. 10 is a diagrammatic view like Fig. 1, but showing only the tractor wheels and the rolling elements and cutting elements of the mower units.

Figure 1:
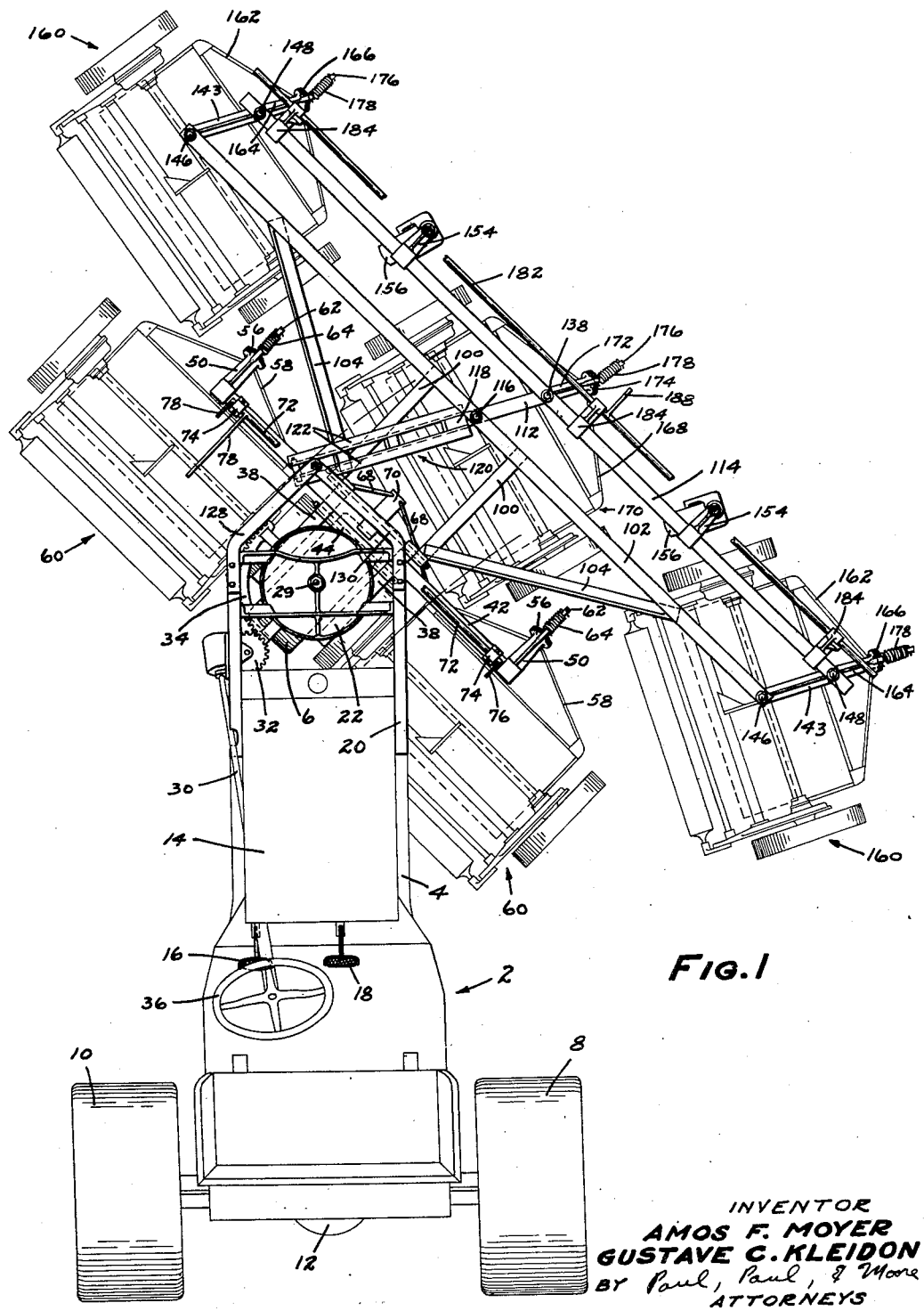

Referring to the drawings, numeral 2 designates generally a tractor provided with a frame 4 mounted upon a single front wheel 6 and a pair of rear driving wheels 8 and 10. The rear wheels 8 and 10 are connected in the usual manner by means of an axle housing which contains differential gearing as at 12. The tractor carries an engine 14 for driving the wheels 8 and 10 and is provided with a pair of foot pedals 16 and 18 for separately operating friction brakes on the wheels 10 and 8 respectively.

The frame 4 of the tractor is provided with an extension frame 20 secured thereto and extending forwardly thereof. The disk 22 which presents a downwardly directed bearing surface, is mounted upon the bottom of the tractor extension frame 20 and rests upon the disk 24 which forms the top of the fork 26 whose legs are connected to the front wheel 6 of the tractor adjacent their lower ends. A bolt and nut 29 hold the bearing surfaces of the disks 22 and 24 in engagement, it being understood that they are free to rotate with respect to one another. Means for steering the tractor comprise a steering column 30 to which is fixed a worm gear meshing with a pinion 32 which in turn engages the teeth on a segment 34 fixed to the disk 24. Upon rotation of the steering wheel 36 it will be seen that the fork 26 will be correspondingly rotated to turn the front wheel 6 of the tractor.

A pair of angle bars 38 are secured along the sides of the legs 40 of the tractor fork 26 and extend forwardly thereof. These angle bars 38 are spaced apart a distance equal to the width of the fork 26 as will be apparent from Figs. 1, 2 and 5, and form a cantilever support for a rear unit connecting member comprising a hollow rectangular cross bar 42. Bar 42 is provided with a rearwardly extending lug 44 at its center which is pivotally connected to a pair of upright legs 46 fixed on the angle bars 38, by means of a pin 48. In order to assure that cross bar 42 will not rotate about the axis of pin 48, hooked means may be provided for holding the forward side of this bar in position, this means being readily detachable when pin 48 is removed.

Figure 5:
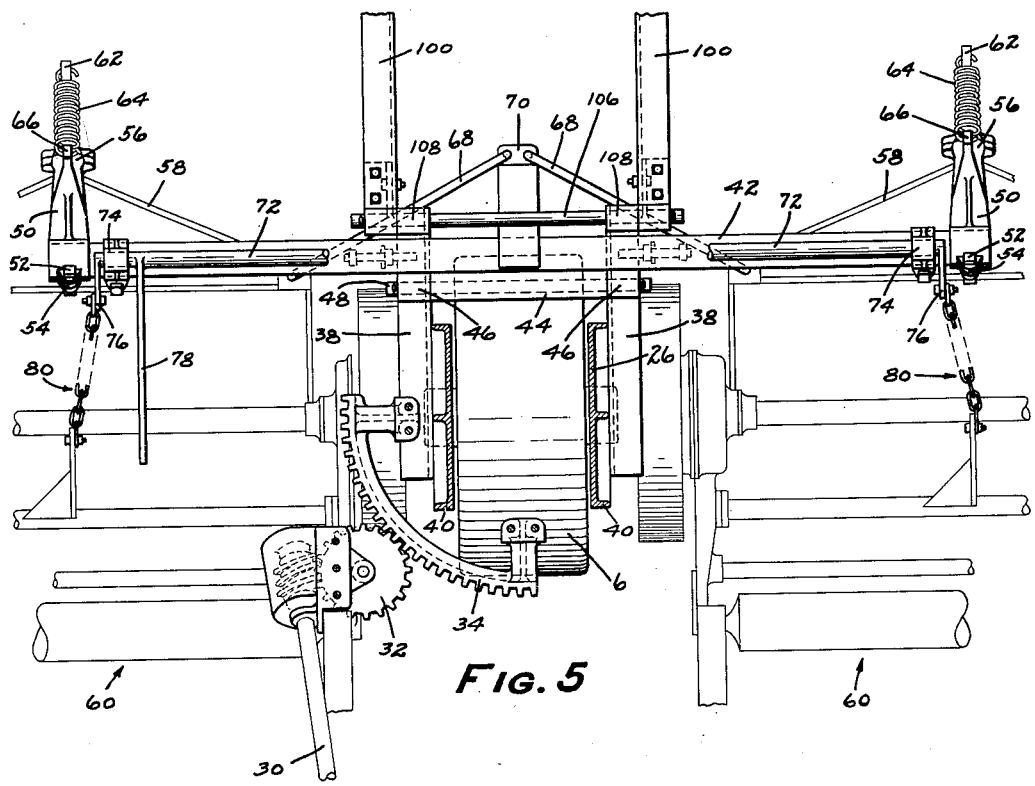
Fig. 5 is a fragmentary plan view of the parts adjacent the front wheel of the tractor.

Fixed at each end of the cross bar 42 is a depending arm 50 which extends forwardly and may be clamped to the rectangular bar 42 by means of the bolts 52 and the connecting member 54. At the end of each arm 50 is a ball and socket joint 56 which connects the arm with the draw bar 58 of one of the rear mower units, each generally designated at 60. The draw bar 58 projects forwardly beyond the ball and socket 56 where it is formed in the shape of a hook 62 engaged by one end of a spring 64, the other end of which is looped about a hook 66 fixed on the arm 50. The spring 64 exerts an upward force on the portion of the draw bar extending forwardly of the ball and socket joint 56 and therefore tends to exert a downward force on that portion of the draw bar to the rear of joint 56, thereby to resiliently urge its mower unit 60 toward the ground. Each of a pair of guide links 68 is pivoted at one end to one of the rear mower drawbars at a point adjacent the front wheel 6 of the tractor, and is pivoted at its other end to a rigid member 70 which is fixed to the cross bar 42 and projects outwardly and downwardly therefrom as best shown in Figs. 4 and 5.

Means are provided for raising the cutters of the rear mower units. These means comprise a shaft 72 which is journalled along the top of cross bar 42 in standards 74 which are fixed to the cross bar. There is a lever arm 76 fixed at each end of shaft 72 and a longer lever arm 78 also fixed to shaft 72 serves as a handle for rotating the same. Chains generally designated at 80 connect the ends of levers 76 with the cutters of the rear mower units. Upon rotation of the shaft 42 in a direction to raise the levers 76, the chains 80 will be raised with the result that the cutters of the units 60 will be moved into raised position as illustrated in Fig. 9. Stops may be provided for holding the cutters in raised position.

From the foregoing description it will be evident that cross bar 42 is rigidly fixed with respect to the fork 26 of the tractor and that it will at all times be parallel to the axis of the front wheel 6. When the front wheel 6 is turned, the cross bar 42 will turn with it as shown in Fig. 1 and the rear mower units 60 will assume positions in which their wheels run parallel to the front tractor wheel 6. That is, the rear mower units 60 will be maintained in transverse alignment with wheel 6. Lateral swinging of the units 60 with respect to wheel 6 is prevented by the guide links 68. As a result of this arrangement of the units 60 with respect to front wheel 6, the tendency of wheel 6 to skid upon the making of a turn is reduced.

The connections between the front row of units and the tractor include a rigid frame consisting of a pair of longitudinally extending arms 100 across the front ends of which a front cross bar 102 is fixed, and diagonal braces 104 fixed at their ends to the arms 100 and the cross bar 102 as shown. This rigid frame is hinged to the tractor at the rear ends of arms 100 by means of a hingepin 106 mounted in standards 108 on the forward ends of the arms 38 which are secured to and project forwardly of the tractor fork as previously set forth.

A mower steering member generally designated at 110 comprises a portion 112 which is pivotally connected to the cross bar 102 and to the equalizer bar 114. The pivot connection with cross bar 102 is made by means of a vertically disposed bolt or pin 116 passing through openings provided in the cross bar 102 and through snug fitting oppositely disposed openings provided adjacent one end of the casting forming portion 112 as clearly shown in Fig. 4. Fixed to a projection 118 of the portion 112 which lies to the rear of bolt 116, is a bent, upwardly and rearwardly extending mower steering arm generally designated at 120. This mower steering arm has two parallel members 122 which are separated to leave a longitudinal slot in which fits a roller 124 mounted on a pin 126. The pin 126 is secured in vertical position between the upper overlapping braces 128 and 130, and the lower overlapping braces 132 and 134. These braces all extend forwardly of the tractor fork and each is firmly bolted at its rear end to the extension frame 20 of the tractor by means of bolts 136 as shown in Figs. 3 and 4. The pin 126 and roller 124 therefore maintain a fixed position with respect to the tractor frame whereas cross bar 102 turns with the tractor fork and tractor front wheel.

The connection between portion 112 of the mower steering arm 110 and the equalizer bar 114 is best illustrated in Figs. 4 and 6. A vertically disposed bolt or pin 138 passes through oppositely disposed snug fitting holes provided in the hollow, rectangular shaped equalizer bar 114, and also passes through a pair of oppositely disposed holes provided in the top and bottom of a hollowed part of the steering arm portion 112. The upper hole 140 in portion 112 is transversely elongated as shown in Fig. 6 but has a width substantially equal to the diameter of the bolt 138. The lower opening is of equal width and only slightly transversely elongated. Mower steering arm 110 is therefore free to rotate about the axis of bolt 138 in a plane perpendicular thereto and equalizer bar 114 is also capable of tilting in a vertical plane to a limited extent as illustrated by the dotted lines in Fig. 6. A U-shaped support 142, which is preferably formed integrally with equalizer bar 114 or welded thereto, reinforces the connection and removes the strain from the bolt of supporting the equalizer bar in upright position.

Figures 7, 8:
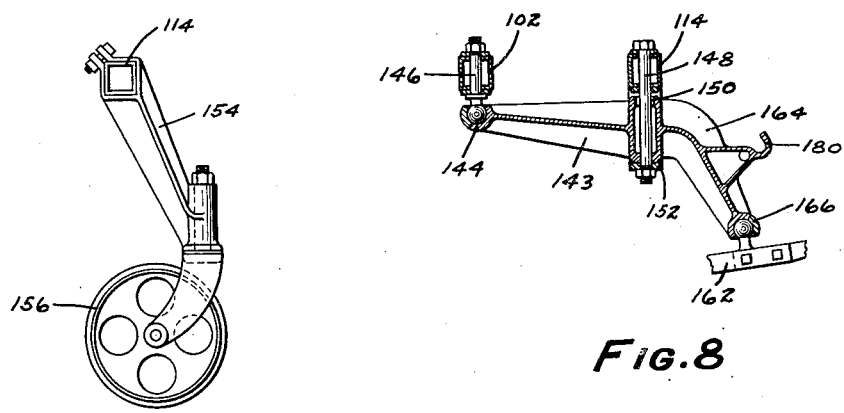
Fig. 7 is a detailed view showing the manner of mounting of the caster wheels upon the equalizer bar.
Fig. 8 is a vertical section showing in detail one of the connections between the front cross bar of the rigid gang frame for the front row, the front equalizer bar, and one of the end mower units in the front row.

Connecting members 143 connect the cross bar 102 and the equalizer bar 114 at their ends. Since both connecting members are similar, only one will be described, reference being had in particular to Fig. 8. The rear end of connecting member 143 has a ball and socket joint connection 144 with a pin 146 secured to the cross bar 102. A pin 148 which passes through oppositely disposed openings formed in a hollowed portion of member 143 adjacent its forward end, pivotally connects the same with equalizer bar 114. The upper opening 150 in member 143 is somewhat elongated longitudinally of the member to allow for the necessary play when irregularities of the ground are encountered. Preferably the member 143 is held in a support 152 which is similar to support 142.

The equalizer bar 114 is provided with legs 154 to which are attached caster wheels 156. These wheels roll over the ground and serve to support the equalizer bar 114 and the forward end of the rigid frame including the cross bar 102. As the caster wheels strike depressions and elevations uniformly, the equalizer bar 114 and the hinged rigid frame are free to move up and down, rotating about the hinge pin 106. When one caster wheel strikes ground having a different elevation than that traveled over by the other, the equalizer bar may tilt in a vertical plane due to its connections with the cross bar 102.

The front end mower units 160 have their draw bars 162 connected to the forwardly projecting extensions 164 of the connecting members 143 by means of ball and socket joints 166. So also, the draw bar 168 of the front center unit 170 is connected to a forwardly projecting extension 172 formed on the portion 112 of the mower steering member 110, by means of a ball and socket joint 174. The draw bar of each front unit has an extension projecting forwardly beyond its ball and socket joint and formed in the shape of a hook 176 engaging one end of a tension spring 178. The other end of each spring 178 is looped over a hook 180 which is fixed on the forwardly projecting extension to which its draw bar is connected. The tensions of the springs tend to hold their mower units resiliently against the ground.

In order to enable lifting of the cutters of the front row mower units there is provided a shaft 182 which is journalled parallel to the equalizer bar 114 in standards 184 fixed thereto. Short levers 186 are fixed to shaft 184 at points opposite the mower units, and a longer lever 188 is also fixed thereto for manually rotating the same. Each of the short levers is connected with its opposite cutter by means of a chain or cable 190 so that the cutters can be raised by manipulation of lever 188 as illustrated in Fig. 9. Here also, stops may be provided for holding the cutters in raised position.

In operation, the units are all propelled by the tractor and when proceeding in a straight line over a uniform surface the various parts assume the positions illustrated in Fig. 2. During such operation the mower steering member 110 follows the center line of the tractor and the equalizer bar 114, the cross bar 102 and the axis of the front tractor wheel 6 are at right angles thereto. Upon striking uniform depressions and elevations, the connections for the front row of units are free to rotate about hinge pin 106 and when there are irregularities in the ground surface, the equalizer bar is capable of rocking in a vertical plane as previously explained so that the caster wheels remain on the ground at all times under normal operating conditions.

When it is desired to turn the gang, the operator manipulates the steering wheel to turn the tractor fork 26 and front tractor wheel 6 in the desired direction. The rear unit connecting member comprising the bar 42 will be turned with the fork 26 and the rear units 60 will also be turned, these rear units being held in transverse alignment with the tractor wheel 6 all the while by means of the guide links 68. Since there is no lateral swinging of these rear units, they will aid in holding the front wheel of the tractor against skidding.

As the fork 26 turns, the rigid frame which includes the cross bar 102 will also turn with respect to the tractor frame and the mower steering arm 110 will be rotated about bolt 116 due to engagement of its slotted end with the roller 124 which occupies a fixed position with respect to the tractor frame. This movement of the mower steering arm swings or shifts equalizer bar 114 in the direction in which the gang is being turned as will be evident from Fig. 1. The front units are free to swing laterally with respect to the equalizer bar and naturally tend to swing away from the direction of turning so as to get into positions wherein their swaths are not overlapped by the rear units. In our arrangement the swinging of the equalizer bar in the direction of turning by means of the mower steering arm counter-balances the natural swinging of the units away from the direction of turning with the result that the front units occupy proper positions with respect to the rear row of units even when proceeding around a turn. Thus no spaces or uncut strips are left between the swaths of the units even when the gang is proceeding around a curve.

Figure 10 illustrates more particularly the respective paths of the mower units when the tractor and gang are proceeding around a curve. The axis M of the front tractor wheel 6, when steered at an angle, will intersect the axis N of the rear tractor wheels at some point O. The point O then becomes the center around which the entire tractor and gang tend to swing with circular motion. Since the drive wheel axes of the rear units 60 are in the same vertical plane as axis M, these units will tend to steer themselves by means of their drawbar balls 56 uniformly with wheel 6 so that their drive wheel axes intersect the point O, since the two balls 56 turn with the tractor front wheel and retain the same relative position with respect thereto.

Each unit 160 of the front row will likewise tend to swing about its respective drawbar ball until its drive wheel axis assumes a direction intersecting the center of turning motion O. However, it will be readily seen that the swath $a'$ of the front center unit 160' would not, when in this position, uniformly overlap the swath of the inside rear unit 60' and outside rear unit 60 unless its drawbar ball 174 is displaced by the distance $b$ from the center line P of the front tractor wheel 6. A similar displacement of the drawbar balls 166 of the outside front units 160 is beneficial to the location of their swaths $a$ with respect to the rear units 60. This displacement $b$ is brought about by the parts already described.

The friction brakes controlled by the foot pedals 16 and 18 are effective against skidding on curves. The operator depresses the pedal for the brake on the inner drive wheel, with respect to the turn, and as a consequence the outer drive wheel acts through the differential gearing to propel the mowers laterally in the desired direction.

While the connections between the various mower units and the tractor are so flexible as to enable each unit to follow most advantageously the contour of undulating ground surfaces, it will be observed that they can all be readily detached from the tractor to leave it serviceable for other purposes. The front row of units and its connecting members may all be removed as a single assembly simply by removal of the hinge pin 106 and the disengagement of the mower steering arm from the roller 124. The rear units and their connecting members are also capable of detachment as a single assembly upon removal of the pin 48.

Since the mowers are not arranged beneath the tractor frame it may be of the conventional short wheel base type which is used for general utility work. While the tractor here illustrated is of the three-wheeled type, it is obvious that the scope of this invention includes similar possible arrangements and connections of mowers associated with a more conventional four-wheeled type of tractor, as well as mowers connected in other positions than in front of the front steering wheel of the tractor.

We claim as our invention:

1. In a gang lawn mower comprising a tractor having steering means, and front and rear transverse rows of mower units connected to the tractor to be propelled thereby, unit steering means associated with said tractor steering means for steering one row of said units in such manner as to cause its swaths to be overlapped by the swaths of the other row of units when the gang is proceeding around a curve.

2. In a gang lawn mower, a tractor with steering means, front and rear transverse rows of mower units connected to the tractor to be propelled thereby and arranged in overlapping relation when proceeding along a straight path of travel, unit steering means operative upon a turning of the tractor for moving the units of one of said rows laterally in a direction to cause its swaths to be overlapped by the units of the other row during the turn.

3. In a gang lawn mower comprising a tractor with ground wheels and having a first transverse row of mower units connected to the tractor to be propelled thereby in front of said wheels, and a second transverse row of mower units also connected to be propelled by the tractor, the units of said first and second rows being connected to arrange themselves in overlapping relation when the gang is proceeding along a straight path of travel, means operative when the gang is turned for moving the units of the first said row laterally in a direction to cause its swaths to be overlapped by the units of the second row during the turning of the gang.

4. In a gang lawn mower comprising a tractor with ground wheels and having a first transverse row of mower units, means including pivot connections allowing lateral swinging of the units for connecting the same to the tractor to be propelled thereby in front of said wheels, and a second transverse row of mower units connected to said tractor to be propelled thereby, the units of said first and second rows being arranged in overlapping relation when proceeding along a straight path of travel, means operative upon a turning of the gang for moving the units of the first said row laterally in a direction to cause its swaths to be overlapped by the units of the second row during the turn.

5. In a gang lawn mower comprising a tractor having a front transverse row of mower units connected to the tractor to be propelled thereby in front thereof, and a rear transverse row of mower units arranged to overlap the swaths of the front row when proceeding along a straight path of travel and also connected to be propelled by the tractor, means operative upon a turning of the gang for moving the units of the front row laterally with respect to the tractor and in the direction of turn.

6. In a gang lawn mower comprising a tractor having a front transverse row of mower units each pivotally connected to the tractor to be propelled thereby in front thereof and each being free to swing laterally with respect thereto, and a rear transverse row of mower units arranged to overlap the swaths of the front row when proceeding along a straight path of travel and also connected to be propelled by the tractor, means operative upon a turning of the gang for moving the units of the front row laterally with respect to the tractor and in the direction of turn.

7. In a gang lawn mower comprising a tractor having a steering mechanism, a front transverse row of mower units connected to the tractor to be propelled thereby in front thereof, and a rear transverse row of mower units arranged to overlap the swaths of the front row when proceeding along a straight path of travel and also connected to be propelled by the tractor, means associated with the tractor steering mechanism for moving the units of the front row laterally with respect to the tractor and in the direction of turn.

8. In a gang lawn mower comprising a tractor having a steering mechanism, a front transverse row of mower units each of which is pivotally connected to the tractor to be propelled thereby in front thereof, and is free to swing laterally with respect thereto, a rear row of transverse mower units arranged to overlap the swaths of the front row when proceeding along a straight path of travel and also connected to be propelled by the tractor, means associated with the tractor steering mechanism for moving the units of the front row laterally with respect to the tractor and in the direction of turn.

9. In a tractor propelled gang lawn mower having front and rear transverse rows of mower units arranged in overlapping relation when proceeding along a straight path of travel, means for holding the units of one of said rows in transverse alignment with a front wheel of the tractor when proceeding around turns, and means operative upon the making of a turn for laterally shifting the units of the other row in such manner as to cause their swaths to overlap those of the said units held in transverse alignment.

10. In a tractor propelled gang lawn mower having front and rear transverse rows of mower units positioned in overlapping relation when proceeding along a straight path of travel, means for holding the units of the rear row in transverse alignment with a front wheel of the tractor when proceeding around turns, and means operative upon the making of a turn for laterally shifting the units of the front row in the direction of turn.

11. In a tractor propelled gang lawn mower having a front transverse row of mower units each of which is disposed in front of the tractor and pivotally connected thereto so as to be propelled thereby and free to swing laterally with respect thereto, and a rear transverse row of mower units connected to the tractor to be propelled thereby, means for holding the units of said rear row in transverse alignment with a front wheel of the tractor upon the making of a turn, and means operative upon the making of a turn for laterally shifting the units of the front row in the direction of turn.

12. In a gang lawn mower comprising a tractor provided with a front wheel whereby it is steered and a pair of rear drive wheels, and a transverse row of mower units in front of said front wheel and arranged to be propelled by said tractor through connections permitting them to swing laterally, a separately operable friction brake for each drive wheel of the tractor.

13. In a gang lawn mower comprising a tractor provided with a front wheel whereby it is steered and a pair of rear drive wheels and a differential mechanism therefor, and a transverse row of mower units in front of said front wheel and arranged to be propelled by said tractor through connections permitting them to swing laterally, a separately operable friction brake for each drive wheel of the tractor for assisting the tractor in propelling the mower units laterally around curves.

14. In a tractor propelled gang lawn mower, a rigid frame hinged to the tractor about a transverse axis and extending forwardly thereof, a plurality of mower units arranged to form a front transverse row, pivot means for connecting each of said units to said frame and permitting lateral swinging with respect thereto, a rear transverse row of mower units arranged to overlap the swaths of the front row and also connected to the tractor to be propelled thereby, and means operable upon turning for shifting the units of the front row laterally with respect to said frame and in the direction of turn.

15. In a tractor propelled gang lawn mower, a rigid frame hinged to the tractor about a transverse axis and extending forwardly thereof, a plurality of mower units arranged to form a front transverse row, pivot means for connecting each of said units to said frame and permitting lateral swinging with respect thereto, a rear transverse row of mower units arranged to overlap the swaths of the front row and also connected to the tractor to be propelled thereby, means for holding the units of said rear row in transverse alignment with a front wheel of the tractor, and means operable upon turning for shifting the units of the front row laterally with respect to said frame and in the direction of turn.

16. In a gang lawn mower comprising a propelling tractor having a frame, a front wheel, and a member rotatable with respect to the frame for connecting the same with the front wheel, a rigid gang frame including a front cross bar, said gang frame being pivotally connected at its rear end to said front wheel connecting member on a transverse axis, an equalizer bar, rolling members for the equalizer bar, connecting members each pivotally connected to the said front cross bar and the said equalizer bar on vertical axes, a plurality of mower units forming a front row and each having a draw bar connected to said equalizer bar by a universal joint, a plurality of other units forming a rear row and connected to the tractor to be propelled thereby, and means associated with said tractor frame and gang frame for shifting said equalizer bar laterally in the direction of turn, upon the making of a turn.

17. In a gang lawn mower comprising a propelling tractor having a frame, a front wheel, and a member rotatable with respect to the frame for connecting the same with the front wheel, a rigid gang frame including a front cross bar, said frame being pivotally connected at its rear end to said front wheel connecting member on a transverse axis, an equalizer bar, rolling members for the equalizer bar, connecting members each pivotally connected to the said front cross bar and the said equalizer bar on vertical axes, a plurality of mower units forming a front row and each having a draw bar connected to said equalizer bar by a universal joint, a plurality of other units forming a rear row and connected to the tractor to be propelled thereby, means for holding the units of said rear row in transverse alignment with said tractor front wheel upon the making of a turn, and means associated with said tractor frame and gang frame for shifting said equalizer bar laterally in the direction of turn, upon the making of a turn.

18. A structure as claimed in claim 16 wherein the equalizer bar shifting means comprises a steering member which is pivoted to said equalizer bar adjacent its forward end, pivoted to said front cross bar between its ends, and pivotally and slidably connected to said tractor frame adjacent its rear end.

19. In a gang lawn mower comprising a propelling tractor having a frame, a front wheel, and a member rotatable with respect to the frame for connecting the same with the front wheel, a rigid gang frame including a front cross bar, said frame being pivotally connected at its rear end to said front wheel connecting member on a transverse axis, an equalizer bar, legs secured to said equalizer bar, caster wheels for said legs, connecting members each pivotally connected to the said front cross bar and the said equalizer bar on vertical axes, a plurality of mower units forming a front row and each having a draw bar connected to said equalizer bar by a universal joint, a plurality of other units forming a rear row and connected to the tractor to be propelled thereby, and means associated with said tractor frame and gang frame for shifting said equalizer bar laterally in the direction of turn, upon the making of a turn.

20. In a gang lawn mower comprising a propelling tractor having a frame, a front wheel, and a fork pivoted to said frame and wheel, a rigid gang frame extending forwardly of the tractor, said gang frame being pivotally connected to said fork on a transverse axis at its rear end and including a front cross bar at its forward end, a pair of longitudinally extending connecting members each pivoted to said cross bar on a vertical axis at its rear end, an equalizer bar arranged forward of and substantially parallel to said cross bar, rolling members for supporting the equalizer bar, the said longitudinally extending connecting members being pivotally connected to the equalizer bar on vertical axes adjacent their forward ends, a plurality of mower units each connected to said equalizer bar by means of a universal joint, and means associated with the tractor frame and gang frame for laterally shifting said equalizer bar upon the making of a turn.

21. In a gang lawn mower comprising a propelling tractor having a frame, a front wheel and a fork pivoted to said frame and wheel, a rigid gang frame extending forwardly of the tractor, said gang frame being pivotally connected to said fork on a transverse axis at its rear end and including a front cross bar at its forward end, an equalizer bar arranged forwardly of the cross bar and substantially parallel thereto, rolling members for supporting said equalizer bar, means connecting said cross bar and equalizer bar for propelling the latter from the former, said means enabling the equalizer bar to shift laterally and oscillate in a vertical plane with respect to the cross bar, a plurality of mower units, each universally connected to said equalizer bar, and forming together a front row, and means associated with said tractor frame and gang frame for laterally shifting said equalizer bar in the direction of turn upon the making of a turn.

22. A structure as claimed in claim 21 wherein there is a transverse rear unit connecting member secured to said fork, a plurality of additional mower units universally connected to said member and forming together a rear row, and guide links connected to said member and units of the rear row for holding them in transverse alignment with the front tractor wheel, whereby said rear unit and its connections may be removed from the tractor as a single assembly upon disengagement of the rear unit connecting member, and whereby said front row and its connections may also be removed from the tractor as a single assembly upon disengagement of the rigid gang frame and the lateral shifting means for the equalizer bar from the tractor.

23. In a gang lawn mower, a propelling tractor with steering means, an equalizer bar transversely disposed and connected to the tractor by means permitting transverse shifting, oscillation and vertical movement in the vertical plane thereof, caster wheels supporting the equalizer bar, bar shifting means actuated by the tractor steering means, and a plurality of lawn mower units universally connected to and drawn by said bar.

24. A power gang lawn mower comprising a tractor having a front wheel by which it is steered, a lawn mower unit operated by said tractor in front of the front wheel through universal connection to a forwardly extending arm, and means operative upon the steering of said wheel for so laterally swinging the arm that the said universal connection is laterally displaced further than the centerline of the front wheel.

25. In a gang lawn mower, a propelling tractor with steering means, an equalizer bar transversely disposed and connected to the tractor in a laterally shiftable manner, a plurality of lawn mower units universally connected to said bar and drawn thereby, and shifting means for said bar connected to the tractor steering means.

26. In a gang lawn mower, a propelling tractor with steering means and supporting wheels, an equalizer bar transversely disposed and connected to the tractor in a laterally shiftable manner, a plurality of lawn mower units universally connected to said bar and drawn thereby, one of said units being located ahead of one of said supporting wheels so that the track of the latter is within the swath of the former, and shifting means for said bar connected to said steering means whereby the bar and units are laterally shifted in the direction of steering the tractor.

27. In a gang lawn mower comprising a tractor having steering means and drive wheels, a row of mowing units transversely disposed ahead of said drive wheels and connected to the tractor, other mowing units independently connected to the tractor, displaced longitudinally of the tractor from the said row, and disposed laterally to cut the spaces between the swaths of the said row when proceeding along a straight path of travel, and means connected to said steering means to shift said row laterally with respect to the tractor so that its swaths will overlap said other mowers when proceeding around a curve.

28. In a gang lawn mower comprising a front row of mowing units and a rear row of mowing units arranged to cut the spaces between the swaths of the front row while traveling in a straight line, steering means whereby one of said rows is shifted laterally with respect to the other row while traveling upon curves, thereby maintaining the swaths of said front and rear rows in overlapping relation.

29. A gang lawn mower comprising a transverse row of mowing units that are held against swinging laterally, a second transverse row of mowing units pivoted to swing laterally spaced from the first mentioned row longitudinally of the direction of travel and arranged in offset positions with their swaths overlapping the swaths of the first mentioned row, and steering means whereby the said pivots for the second mentioned row are shifted laterally with respect to the first mentioned row while traveling on curves, thereby maintaining the swaths of said rows in overlapping relation.

30. The combination with a tractor having a steerable unit supporting the front end thereof, of a gang of lawn mower units arranged adjacent the forward end of the tractor and connected therewith, and means operative independently of forward movement of the tractor for shifting at least one of the units transversely of the machine and in conjunction with the operation of said steerable tractor unit, said shifting means being separate from but operatively connected with the steerable unit.

31. In a gang lawn mower, a tractor having a ground wheel and means for steering said wheel, a plurality of mower units each universally connected to said tractor, so that the units are arranged in a transverse row, the members of which are transversely spaced, transversely shiftable means connected to said tractor and having another mowing unit universally connected thereto and displaced from the other units in a direction of travel of the tractor and positioned to cut an overlapping swath relatively to two of the other units when the tractor is traveling in a straight path, and means by which the steering means shifts said shiftable means to cause the last mentioned mower to continue to cut such an overlapping swath when the tractor is traveling in a curved path.

32. In a gang lawn mower, a tractor having a ground wheel and means for steering said wheel, a plurality of mower units each universally connected to said tractor so that the units are arranged in a transverse row the members of which are transversely spaced, transversely shiftable means connected to said tractor and having another mowing unit universally connected thereto and displaced from the other units in a direction of travel of the tractor and positioned to cut an overlapping swath relatively to two of the other units when the tractor is traveling in a straight path, and means by which the steering means shifts said shiftable means to cause the last mentioned mower to continue to cut such an overlapping swath when the tractor is traveling in a curved path, said last mentioned unit being placed forwardly of all other units.

33. In a gang lawn mower, a tractor having a ground wheel and means for steering said wheel, a pair of mower units each universally connected to said tractor so that the units constitute a transverse row the members of which are transversely spaced, transversely shiftable means connected to said tractor forwardly of the row and having another mowing unit universally connected thereto and disposed forwardly of the other units in a direction of travel of the tractor and positioned to cut an overlapping swath relatively to the other units when the tractor is traveling in a straight path, and means by which the steering means operates said shiftable means to cause the last mentioned mower to continue to cut such an overlapping swath when the tractor is traveling in a curved path.

AMOS F. MOYER.
GUSTAVE C. KLEIDON.